(12) United States Patent
Joyce et al.

(10) Patent No.: US 7,678,353 B2
(45) Date of Patent: Mar. 16, 2010

(54) PROCESS FOR SCRUBBING ALKYL HALIDES FROM GASES

(75) Inventors: Peter J. Joyce, Mullica Hill, NJ (US); Roman Bielski, Coopersburg, PA (US)

(73) Assignee: Value Recovery, Inc., Bridgeport, NJ (US)

( * ) Notice: Subject to any disclaimer, the term of this patent is extended or adjusted under 35 U.S.C. 154(b) by 1437 days.

(21) Appl. No.: 10/972,875

(22) Filed: Oct. 25, 2004

(65) Prior Publication Data

US 2006/0088462 A1 Apr. 27, 2006

(51) Int. Cl.
*B01D 53/00* (2006.01)
(52) U.S. Cl. .................. 423/240 R; 588/316; 588/406
(58) Field of Classification Search ............. 423/240 R; 422/171; 588/316, 406
See application file for complete search history.

(56) References Cited

U.S. PATENT DOCUMENTS

| | | | |
|---|---|---|---|
| 4,309,281 A | 1/1982 | Dessau | |
| 4,377,395 A | 3/1983 | Herbrechtsmeier et al. | |
| 5,089,457 A | 2/1992 | Gaylard et al. | |
| 5,419,885 A | 5/1995 | Doran et al. | |
| 5,481,042 A | 1/1996 | Burba, III et al. | |
| 5,904,909 A | 5/1999 | Yates et al. | |
| 6,207,120 B1 | 3/2001 | Belmonte et al. | |
| 7,090,812 B2 * | 8/2006 | Joyce et al. | 423/242.2 |
| 2004/0126295 A1 | 7/2004 | Joyce et al. | |

FOREIGN PATENT DOCUMENTS

CA 1282317 4/1991
EP 0551436 6/1994

OTHER PUBLICATIONS

James G. Leesch et al., "Methyl bromide adsorption on activated carbon to control emissions from commodity fumigations," *Journal of Stored Products Research*, vol. 36, 2000, pp. 65-74.
Laurence G. Miller et al., "Use of Bioreactors to Remove Methyl Bromide Following Contained Fumigations," Proceedings of 2002 Annual International Research Conference on Methyl Bromide Alternatives and Emissions Reductions.
Laurence G. Miller et al., "Bioreactors for Removing Methyl Bromide Following Contained Fumigations," *Environ. Sci. Technol.*, vol. 37, 2003, pp. 1698-1704.
"MeBr Recapture System Up and Running," United States Department of Agriculture, Agricultural Research Service (http://www.ars.usda.gov/is/np/mba/jul01/recap.htm?pf=1).
"Trapping/Destroying Methyl Bromide on Activated Carbon Following Commodity Fumigation," United States Department of Agriculture, Agricultural Research Service (http://www.ars.usda.gov/is/np/mba/oct98/fumig.htm?pf=1).
Kevin Hettenbach et al., Development and Scale-Up of an Aqueous Ethanolamine Scrubber for Methyl Bromide Removal, Organic Process Research & Development, 2002, vol. 6, No. 4, pp. 407-415.
Jianying Gan et al., Recapturing and decomposing methyl bromide in fumigation effluents, Journal of Hazardous Materials, vol. 57, 1998, pp. 249-258.
James G. Leesch et al., Trapping/Destroying Methyl Bromide on Activated Carbon Following Commodity Fumigation, MEBR Newsletter, 1998, pp. 1-2.

* cited by examiner

*Primary Examiner*—Steven Bos
(74) *Attorney, Agent, or Firm*—RatnerPrestia

(57) ABSTRACT

Alkyl halides can be effectively scrubbed from gas streams containing them by passing the gas streams through dispersers having a very small pore size into an aqueous scrubbing liquid containing a nucleophile such as thiosulfate. Optionally, the addition of a water-soluble organic compound to the scrubbing liquid may increase the rate of destruction of the alkyl halide. Alkyl halides such as methyl bromide can be effectively scrubbed from enclosed spaces containing the halide, for example in enclosures used for fumigation.

19 Claims, 1 Drawing Sheet

PROCESS FOR SCRUBBING ALKYL HALIDES FROM GASES

FIELD OF THE INVENTION

This invention relates to destruction of pollutants in a gas. More particularly, this invention relates to removal and destruction of alkyl halides from a gas.

BACKGROUND OF THE INVENTION

Many alkyl halides possess a degree of toxicity, sometimes very high toxicity. For example, the toxicity of methyl bromide is so great that it has been used for many years in the extermination of insects in mills, warehouses, vaults, ships, freight cars, and also as a soil fumigant for use by growers of strawberries, tomatoes, and other crops. Other applications include treatment of ships to remove rodents and treatment of foods such as fruits including dried fruits, grain, flour, nuts, and tobacco products to remove potential pests. Additionally, methyl bromide has been successful in fumigation against various microorganisms including fungi and bacteria. Recently, it has been advocated as the most effective agent against anthrax (*Bacillus anthracis*). Its virtues include the fact that it is not explosive, practically nonflammable, has very high diffusivity and permeability, and has been used safely for over 60 years.

Unfortunately, release of methyl bromide into the atmosphere is generally accepted to cause ozone layer depletion that can result in increased incidences of skin cancer. Thus, there is a need for methods of disposing of methyl bromide without releasing it to the atmosphere. In addition, there is a more general need for methods of rapidly and economically removing volatile alkyl halides such as methyl bromide from streams such as air or petroleum vapors.

Prior art methods for removal of alkyl halides can be divided into nondestructive and destructive ones. Most such methods in either category are not satisfactory for rapid removal of alkyl halides from gaseous streams and/or air volumes.

Non-Destructive Methods of Alkyl Halide Removal

Non-destructive methods of alkyl halide removal typically involve either scrubbing by dissolution of the halide in an appropriate solvent, or by adsorption onto a suitable adsorbent. Scrubbing solvents that work by dissolution of the alkyl halide include for example vegetable oil and marine oil (Canadian Patent 1,282,317). Examples of applicable adsorbing agents include zeolites (U.S. Pat. No. 4,309,281), and activated carbon (J. G. Leesch, G. Knapp, B. E. Mackey, Methyl Bromide Adsorption on Activated Carbon to Control Emissions from Commodity Fumigations, also: J. G. Leesch, G. Knapp, B. E. Mackey, J. Stored Prod. Res., 36, 65, 2000). Methods based on the use of adsorbents or scrubbing solvents suffer from non-discriminatory scrubbing of other volatile compounds in the gas streams, resulting in the formation of unwanted degradation products during regeneration of the adsorbent or scrubbing solvent.

Destructive Methods of Alkyl Halide Removal

Japanese Kokai JP 49-127,862 discloses a method involving a reaction of methyl bromide in isopropanol with ethanolamine dissolved in water. The method takes advantage of a nucleophilic substitution reaction that is, however, not sufficiently rapid for a variety of applications. Another method employs bioreactors and specific species of a-Proteobacteria that can directly oxidize and grow on methyl halides (L. G. Miller, S. M. Baesman, R. S. Oremland, Use of Bioreactors to Remove Methyl Bromide Following Contained Fumigations, Proceedings of 2002 Annual International Research Conference on Methyl Bromide Alternatives and Emissions Reductions; also: L. G. Miller, S. M. Baesman, R. S. Oremland, Bioreactors for Removing Methyl Bromide following Contained Fumigations, Environ. Sci. Technol., 37, 1698, 2003). Yet another destructive method (F. G. Belmonte, K. J. Abrams, J. P. Oppenheim, U.S. Pat. No. 6,207,120 B1; Mar. 27, 2001) proposes to heat and mix a vent gas containing an alkyl halide with a combustible fluid, followed by catalytic oxidation of the mixture. In U.S. Pat. No. 5,904,909, Yates discloses a method of destroying methyl bromide, for example from a fumigation gas stream, by adsorption or retention of that compound on a substrate such as carbon, followed by destruction of the adsorbed methyl bromide by treating it with thiosulfate. They state "if methyl bromide gas is merely bubbled through an aqueous solution of thiosulfate, decomposition of methyl bromide is very slow and incomplete (about 20-30% decomposition after 2 hours)."

Despite these advances, there continues to be a need for rapid and efficient means for removing alkyl halides at low and moderate concentrations from gas streams.

SUMMARY OF THE INVENTION

In one aspect, the invention provides an apparatus for removing an alkyl halide from a gas volume. The apparatus includes a reactor assembly having a reaction vessel containing a single continuous liquid phase containing water and a nucleophile, and one or more gas dispersers having therein a plurality of holes. The holes are between 1 and 200 µm across at a widest part thereof, and the one or more dispersers are immersed in the liquid phase.

In another aspect, the invention provides a method of removing an alkyl halide from a gas volume. The method includes:

withdrawing a gas stream from the gas volume;

passing the gas stream through one or more gas dispersers having therein a plurality of holes, the holes being between 1 and 200 µm across at a widest part thereof, thereby producing gas bubbles; and passing the bubbles through a continuous liquid phase contained in a reaction vessel, the liquid phase containing water and a nucleophile, to produce a purified gas stream.

DETAILED DESCRIPTION OF THE INVENTION

Figure 1:
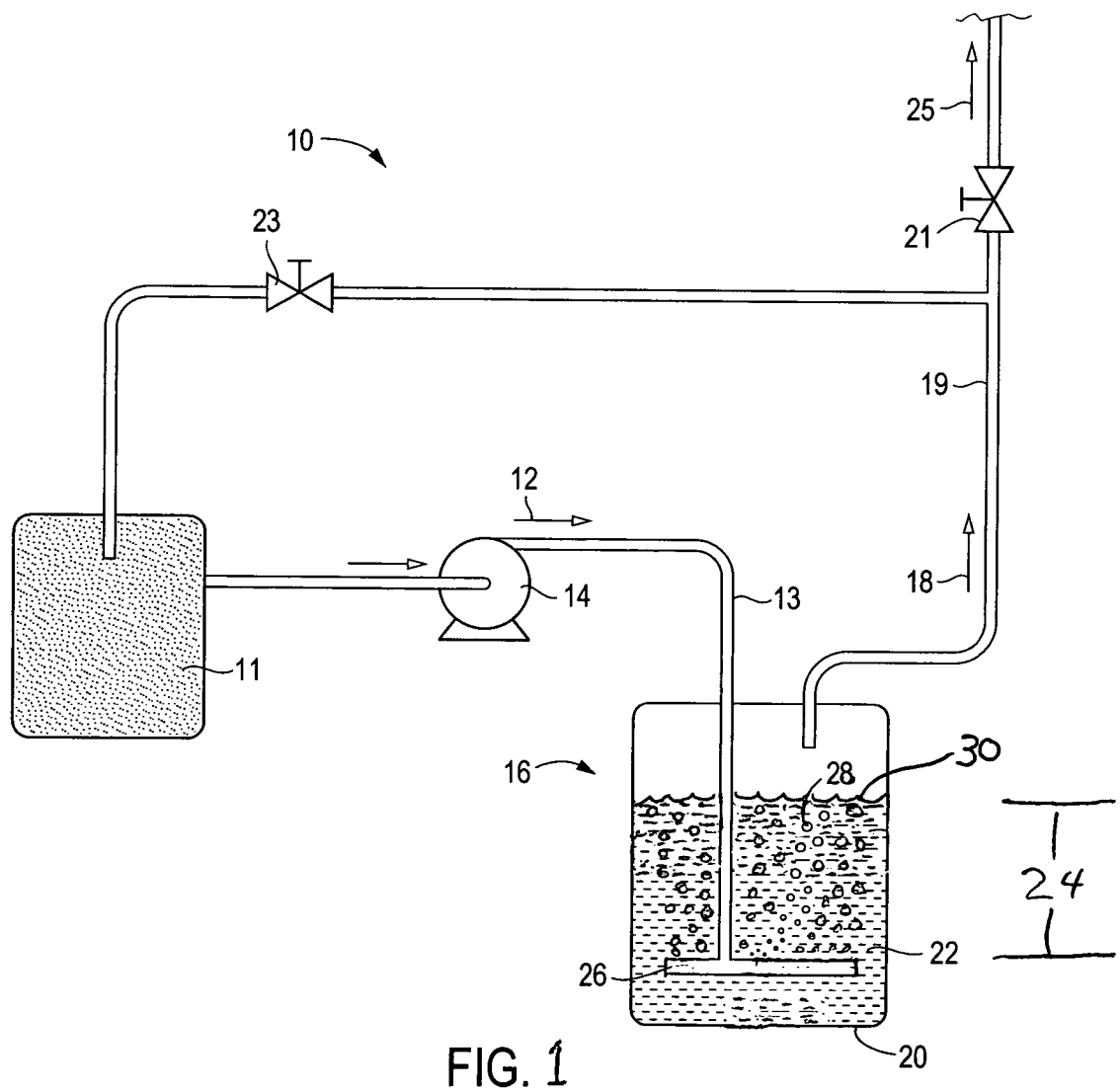
FIG. 1 is a schematic illustration of a gas scrubbing system according to one exemplary embodiment of the invention.

The present invention provides a method of permanently removing alkyl halides from a gas stream or gas volume, for example an air stream or air volume. As used herein, the terms "gas volume" and "air volume" refer to any body of gas or air, respectively, whether contained or not contained. According to the invention, very fine bubbles of gas are passed through an aqueous solution of a nucleophile, optionally containing an organic compound, which has been found to increase the effectiveness of the scrubber. The fine bubbles rise slowly through the aqueous solution, during which time the alkyl halide is converted to relatively nonvolatile materials, which may then be collected for use or merely disposed of. Methods and devices according to the present invention may be applied on either a batch or continuous basis.

The invention will next be illustrated with reference to the FIGURES, wherein the same numbers indicate the same elements in all FIGURES. Such FIGURES are intended to be illustrative rather than limiting and are included herewith to facilitate the explanation of the present invention. The FIGURES are not to scale, and are not intended to serve as engineering drawings.

Attention is now drawn to FIG. 1, which shows a gas scrubbing system according to one exemplary embodiment of the invention. The gas scrubbing system, indicated generally at 10, comprises a gas volume 11 containing a gas having some amount therein of an alkyl halide, typically in the vapor phase but possibly as droplets or as part of other suspended particles. Gas volume 11 may be an unconfined region of gas, or it may be a gas contained within a house or other habitable structure, a fumigation chamber, or within a temporary enclosure such as may be constructed from tarpaulins covering an area of crops or the like. Gas volume 11 may also be in a tank or similar gas-handling container.

A gas stream 12 is pulled from the gas volume by pump 14 through gas stream feed tube 13, and delivered to reactor assembly 16. Although a pump is shown for item 14, a fan or other air-moving device may be used. Also, while the embodiment shown in FIG. 1 shows pump 14 being situated upstream of reactor assembly 16, the placement of the pump is not an important design feature, and the pump could be downstream of the reactor assembly. A purified gas stream 18 exits from reactor assembly 16 through purified gas stream return tube 19. By appropriate use of valves 21 and 23, purified gas stream 18 may be recycled back to gas volume 11, or it may be delivered to vent 25, which may lead to the atmosphere or into a product tank or other enclosure, or into another scrubber. By recycling purified gas stream 18 back to gas volume 11, a higher level of alkyl halide removal may be obtained. Although a single reactor assembly 16 is shown in FIG. 1, two or more may be used, and they may be connected in parallel and/or in series (not shown). If two or more reactors are used, it may be desirable to use optional additional pumps to facilitate gas flow. For example, if two reactors are connected in series, a second pump may conveniently be located between the reactors, or elsewhere.

Reactor assembly 16 comprises a reaction vessel 20 containing an aqueous phase 22. Reaction vessel 20 may be of any convenient shape and appropriate material of construction. In the embodiment shown in FIG. 1, gas stream 12 passes into aqueous phase 22 through a gas disperser 26, for example a glass frit that provides introduction of small bubbles of feed gas into the liquid to enhance the overall gas-liquid mass transfer rate. Other types of gas disperser may also be used, for example a pipe with holes in it, or a plate with holes in it, or any other device known in the art to convert the gas stream into small bubbles. Bubbles 28 rise through a liquid column 24 through aqueous phase 22 until they reach the upper surface 30 of the aqueous phase, during which time contact is made such that the alkyl halide can rapidly be carried into the aqueous phase 22. It is preferred that the bubbles 28 be small, to maximize the gas-liquid surface area and thereby increase the rate at which alkyl halide is carried into aqueous phase 22 to the point where gas-liquid mass transfer is not the rate-limiting step in the reaction of alkyl halide with nucleophile.

FIG. 1 does not show an agitator, although one may be used. However, the invention does not rely on any mechanical stirring, but takes advantage of the turbulence created in the liquid phase due to the introduction of the gas through the small openings in the frit. Aqueous phase 22 may be recycled or discarded when the nucleophile (discussed below) has been depleted due to reaction with the alkyl halide. Aqueous phase 22 may also be treated with appropriate reagents after scrubbing has been completed, for example to minimize toxicity or odor, and/or purified gas stream 18 may be treated for these or other purposes.

In the case where gas volume 11 comprises methyl bromide, a wide range of concentrations of methyl bromide may be scrubbed effectively, according to the invention. Thus for example, methyl bromide in air having a concentration of from 1 ppm to 99% by volume may be efficiently scrubbed. More typically, the concentration may be from about 25 ppm to about 10% by volume, most typically about 0.4% to about 6.0% by volume. Moreover, methyl bromide in these various concentration ranges in gases other than air, for example hydrocarbon gases, may be effectively scrubbed as well, according to the invention.

In some applications, for example where alkyl halide levels are to be reduced to an especially low level, it may be desirable to connect two or more scrubbers in series, such that purified gases exiting a scrubber are further purified by subsequent passage through another. On the other hand, in some applications it may be desired to rapidly purify a large volume of gas, in which case two or more scrubbers may be used in parallel. Combinations of series and parallel arrangements may also be practiced according to the invention, using multiple scrubbers.

Gas Flow and Dispersion

The inventors have found that dispersion of an alkyl halide-containing gas into very fine bubbles, with the bubbles passing through a sufficient travel distance in an aqueous solution containing an appropriate amount of a suitable nucleophile, makes possible a surprisingly rapid reactive destruction of alkyl halides and thereby provides fast and extensive removal of the halides from a gas.

Suitably small bubbles may be provided by any means known in the art, but they are conveniently provided by use of porous tubes (spargers) having pores between 1 and 200 μm across at their widest point. More typically, the pores will be between 10 and 50 μm across. It is preferable that the majority of pores be within the range specified, but this is not an absolute requirement. The holes are typically roughly circular, but need not be of any particular shape. The spargers are typically situated such that there is a relatively unobstructed or free flow of bubbles through the aqueous phase containing the nucleophile. If the bubbles collide with each other in a manner where they lose their integrity and thus create larger bubbles, as is the case when the volume of gas passed through the sparger is too great or the spargers are too close to each other, significantly reduced removal efficiencies may be encountered due to coalescence of smaller bubbles to form larger ones. When this happens, it may result in less surface area for mass transfer per unit volume of gas. The design issue becomes providing enough gas-liquid contact area via the creation of small, finely divided bubbles, to transfer significant amounts of reactive alkyl halide gas to the liquid phase. One of the factors determining the bubble size is the size of pores coming through the sparger tubes. When the pores are too small the corresponding pressure drop may be very large thus requiring gas compression of large volumes of gas that dramatically increases the processing cost.

In some embodiments, the spargers are made of polypropylene or other inexpensive plastic materials. Such spargers typically are quite effective and relatively inexpensive, and frequently exhibit very good chemical resistance and are easy to install. Other suitable materials of construction include, as nonlimiting examples, metals and ceramic materials. Metal spargers made of sintered metal are also available, and they can be scaled up by using a larger number of cylindrical units. Although many spargers are of a cylindrical shape, flat spargers are also suitable, and in fact spargers for use according to the invention may be of any shape.

Typically, the distance from the upper end of disperser 26 to upper surface 30 of the liquid phase is at least 6 inches and more typically at least 12 inches. The distance is typically at most 120 inches as more typically at most 36 inches. However, greater liquid depths can be used, as long the pump has sufficient capacity to introduce gas at the desired flow rate and pressure. Thus, no real upper bound for liquid depth exists other than that resulting from pump capability, available space, and other practical limitations.

The inventors have found that the rate at which the gas stream enters the scrubber affects the degree of completeness with which the alkyl halide is consumed, with too high a rate tending to decrease the degree of halide destruction. One suitable measure of the rate of gas flow relative to the size of the scrubber is the superficial gas velocity, which may be calculated by dividing the volumetric flow rate of gas into the scrubber by the area of the upper surface 30 of the liquid phase. An acceptable superficial gas velocity for a given situation depends inter alia upon the type and concentration of alkyl halide in the gas stream, the type and concentration of nucleophile employed, the amount and type (if any) of soluble organic compound in the aqueous phase, the size of the bubbles produced by the gas disperser(s), the distance that the bubbles travel through the aqueous phase, the temperature of the aqueous phase, and the desired level of alkyl halide removal from the gas stream. For example, scrubbing of methyl bromide from an air stream with thiosulfate in the presence of PEG 200, using a gas disperser having approximately 20-μm pores and a 12-inch travel of the resulting bubbles, a superficial gas velocity may typically be at most 1.1 ft/min, and more typically will be at most 0.8 ft/min.

Aqueous Phase

Aqueous phase 22 is a single continuous aqueous liquid phase containing a nucleophile. The single continuous aqueous phase may include dissolved materials such as co-solvents, and of course products formed by the nucleophilic reaction. The aqueous phase is typically essentially free of suspended undissolved material, but this is not required. The term "nucleophile" as used herein means an anion or molecule having a high electron density which is accessible for reaction with another molecule by displacement of a leaving group, typically an anion such as halide. Due to the presence of a good leaving group (halide anion), alkyl halides can take part in nucleophilic substitution reactions with nucleophiles, such reactions typically (but not necessarily) being of the bimolecular ($S_N2$) type.

Many neutral and anionic nucleophiles can participate in nucleophilic substitution reactions with alkyl halide, according to this invention. A non-limiting list of anions suitable for use as nucleophiles according to the invention includes the following and their derivatives: cyanide ($CN^-$), thiocyanate ($SCN^-$), cyanate ($OCN^-$), bisulfide ($HS^-$), sulfide ($S^{2-}$), carbonate ($CO_3^{2-}$), bicarbonate ($HCO_3^-$), thiocarbonates (monothio, dithio, and trithio), azide ($N_3^-$), sulfite, bisulfite, alkyl, aryl, or aralkyl thiolate, nitrite, nitrate, phosphates (mono and di hydrogen phosphates plus phosphate), thiophosphates, biselenide ($HSe^-$), selenide ($Se^{2-}$), (substituted and non-substituted) benzenesulfonate, chloride, bromide, fluoride, iodide, thiosulfate, chlorate, hypochlorite, malonate, carboxylates such as trichloroacetate ($CCl_3COO^-$), dichloroacetate, chloroacetate, terephthalate, adipate, lactate, m-chloroperbenzoate, formate, acetate, acrylate, propionate, butyrate, benzoate, furoate, oxalate, phthalate, hydrogen phthalate, silicates, bromate, periodate, performate, and phenolate, cresolate, and catecholate. Suitable neutral nucleophiles may include for example ammonia and primary, secondary, and tertiary amines, where the substituents on nitrogen may be any combination of alkyl, aryl, and aralkyl groups, and phosphines analogous to such amines. In this context, the term "derivative" means a compound that contains one of the nucleophilic groups listed above.

Particularly suitable nucleophiles for use according to the invention include compounds containing sulfur or nitrogen at the nucleophilic center. As used herein, the term "nucleophilic center" means that atom which becomes bonded to the alkyl halide residue by virtue of the nucleophilic reaction. Specific examples of suitable sulfur nucleophiles include aliphatic and, preferably, aromatic thiols and their salts, aliphatic and aromatic disulfides and polysulfides, sulfide anion, bisulfide anion, thiosulfate anion, sulfite or bisulfite anion, and thiocyanate anion. In one exemplary embodiment of the invention, the nucleophile comprises at least one of sodium sulfide and sodium bisulfide at a concentration of from about 0.1 wt % to the saturation limit in the aqueous phase. When sulfur nucleophiles are used, it may be advantageous to oxidize the resulting reaction products, for example with sodium hypochlorite, to convert them to materials having less odor.

Other suitable nucleophiles are alkoxides, carboxylates, hydroxide, and selenium analogs of sulfur nucleophiles.

When a precursor species must be ionized to become a highly reactive nucleophile, for example when a hydroxy compound or thiol or carboxylic acid must be converted to the corresponding anion, a pH-adjusting agent is used in such an amount as to ensure that the pH is raised to a level sufficient to ionize the chemical species, namely by removing a proton from the species and generating a negatively charged species in the aqueous phase. The required pH is dependent on the nature of the nucleophile, namely whether its conjugate acid is a strong or weak acid. For example, if the nucleophile is the anion of a weak acid, a relatively higher pH may be required in order to produce a sufficient concentration of the anion. Conversely, when the chemical species already exists as a nucleophilic anion or as a neutral compound that can act as a nucleophile, no pH-adjusting agent may be needed. When a pH adjusting agent is needed, the particular amount of the agent or base will vary depending on process conditions, but can be optimized easily by altering the concentration and determining its effect on yield, bearing in mind the ranges of excess molar concentrations set forth above.

According to the present invention, a pH-adjusting agent (if needed to produce suitable quantities of nucleophile) is used in an amount sufficient to provide an excess molar concentration of base in the range between −0.99 and 1.0, preferably between −0.25 and 0.5, more preferably between stoichiometric and 0.25, and most preferably between 0.01 and 0.1. As used herein, the term "stoichiometric" means the amount of base indicated by a balanced chemical equation to be necessary to convert all of the precursor species to the desired nucleophile. Thus, the "excess molar concentration of base" is the amount of base actually in the system above that which would be stoichiometrically required to neutralize ionizable hydrogen atoms, and is expressed herein as the difference between the actual concentration of base and the stoichiometric concentration divided by the stoichiometric concentration. Thus, a negative value of excess molar concentration of base contemplates that less than the stoichiometric amount.

A suitable pH for purposes of the invention is one at which a nucleophilic anion is present and is at least partially soluble in the aqueous solution, typically from pH 7 to 13.5. However, certain embodiments of the present invention may provide sufficient amounts of nucleophile even at lower pH values, even as low as a pH of about 1, depending on the nucleophile used.

It should be recognized that the pH as used herein refers to the pH in the aqueous phase. The pH adjusting agent may be added to the aqueous phase prior to contacting the gas stream, or afterwards. Any of a number of suitable pH adjusting agents may be used, but some typical ones are sodium hydroxide, potassium hydroxide, magnesium hydroxide, calcium hydroxide, lithium hydroxide, ammonium hydroxide, magnesium carbonate, calcium carbonate, tetraalkyl ammonium hydroxides, sodium and potassium carbonates, bicarbonates, phosphates, similar salts, and mixtures thereof.

According to one exemplary embodiment of the invention, aqueous phase 22 comprises from about 10 wt % to about 20 wt % of sodium bisulfide dissolved in water. Such a composition is highly effective in reacting with alkyl halides, for example methyl bromide. The aqueous phase may also contain a water-soluble organic compound, and the presence of such compounds has been found in some cases to increase the rate and/or completeness of alkyl halide destruction. For example, the addition of water soluble organic compounds such as N-methylpyrrolidone, dimethyl formamide, dimethyl sulfoxide (DMSO), and poly(ethylene glycol) to the water phase has been shown to improve the level of removal of methyl bromide. Without wishing to be bound by any particular theory or explanation, it is believed that the water soluble organic compound increases alkyl halide solubility by decreasing the polarity of the aqueous phase, and that this increases the rate of reaction between the alkyl halide and the nucleophile. Water-soluble organic compounds may constitute between 1 and 99 wt % of the aqueous phase, more typically between 1 and 25 wt %. In some embodiments, the organic compound is relatively nonvolatile, by which is meant it does not boil below 125° C. In some embodiments of the invention, the organic compound is a polyglycol according to the formula $H-(OCH_2CHR)_n-OH$, wherein n is an integer from 1 to 20 and R is H or $CH_3$. One useful example is tetraethylene glycol.

Preferred nucleophilic reaction conditions for the destruction of alkyl halides depend on a number of factors, including the specific nucleophilic species used, and the organic substrate used. In general, the time and temperature should be selected to cause the reaction to proceed rapidly. As is well known, the choice of temperature is dictated by the kinetics of the reaction and the solubility of alkyl halide in the reaction medium. Reactions that occur more slowly are preferably run at higher temperatures. Lower reaction temperatures may however be suitable or even preferable in some situations, provided only that the reaction rate of alkyl halide be sufficiently fast to achieve the desired degree of removal. Typical suitable temperatures are from −3° C. to 105° C., more typically from 2 to 40° C., and most typically from 5 to 30° C.

The scrubber may be run at approximately atmospheric pressure, i.e. atmospheric pressure plus the incremental additional pressure generated by the head of liquid over the disperser. It may also be operated at pressures well above atmospheric, and there is no known limit to how high a pressure may be used. Higher pressures may increase the rate of reaction, and may be especially useful in cases where there is a relatively high concentration of alkyl halide and a correspondingly lower level of diluent gas (e.g. air) in the feed, since the cost of compressing and decompressing the feed may be less in such a situation. Higher pressures may also be beneficial when a higher scrubber reaction temperature is desired, with the higher pressure making it possible to reduce loss of water or other volatile components.

EXAMPLES

In the following examples, air containing a known concentration of methyl bromide (MeBr) was scrubbed by passing into the equipment indicated, using the indicated aqueous phase scrubbing liquid. Measurements of methyl bromide concentration were performed with a Neutronics MGT3 infrared analyzer (available from Neutronics Corp, Exton, Pa.) calibrated for methyl bromide. Sintered metal sparger elements are available from Mott Corporation, Farmington, Conn., and Plastic sparger elements are available from Genpore, Inc. Reading, Pa.

Example 1

Equipment

Reactor Vessel: 13 in. by 13 in. rectangular plastic tank fitted with one sparging element centered and entering from one side wall, one inch from the bottom.

Sparger Element: 6-inch metal cylinder (Mott Sparger, 0.75 in. OD, Model No. 2312-A04-06-A00-02-AB)

Air Flowrate: 1.00 CFM (GF-1460, Size 4, glass ball, Gilmont Flowmeter)

Aqueous Phase:

20 wt % ammonium thiosulfate, 10 wt % polyethylene glycol, balance tap water.

Liquid Level:

=8.25 inches above top of sparge element (without gas flowing)

Concentration of MeBr in Feed:

15,000 ppm Calibration gas supplied by Scott-Marin, Riverside Calif.

Aqueous phase was charged to the plastic tank. A known concentration (15,000 ppm) of methyl bromide gas in air under pressure was regulated through the flowmeter and passed upwards through the bottom of the plastic box reactor. The outlet concentration of methyl bromide was measured for 10 minutes at an average value of 5,600 ppm with an experimental uncertainty of 1.2%, showing a 63% removal. Polyethylene glycol used in the aqueous phase had a molecular weight of about 400.

Example 2

Equipment

Reactor Vessel: 13 in. by 13 in. rectangular plastic tank fitted with one sparging element centered and entering from one side wall, one inch from the bottom.

Sparger Element: 8.75-inch polyethylene cylinder (Genpore, 0.875 in. OD, 0.5 in ID)

Air Flowrate: 1.00 CFM (GF-1460, Size 4, glass ball, Gilmont Flowmeter)

Aqueous Phase:

20 wt % ammonium thiosulfate, 10 wt % polyethylene glycol, balance tap water.

Liquid Level:

=8.25 inches above top of sparge element (without gas flowing)

Concentration of MeBr in Feed:

15,000 ppm Calibration gas supplied by Scott-Marin, Riverside Calif.

Aqueous phase was charged to the plastic tank. A known concentration (15,000 ppm) of methyl bromide gas under pressure was regulated through the flowmeter and passed upwards through the bottom of the plastic box reactor. The outlet concentration of methyl bromide was measured for 10 minutes at an average value of 6,200 ppm with an experimental uncertainty of 1.2%, showing a 56% removal.

Example 3

Equipment

Reactor Vessel: 13 in. by 13 in. rectangular plastic tank fitted with one sparging element centered and entering from one side wall, one inch from the bottom.

Sparger Element: 8.75-inch polyethylene cylinder (Genpore, 0.875 in. OD, 0.5 in ID)

Air Flowrate: 0.51 CFM (GF-1460, Size 4, glass ball, Gilmont Flowmeter)

Aqueous Phase:

18 wt % ammonium thiosulfate, 9 wt % polyethylene glycol, 9% tetraethylene glycol, balance tap water.

Liquid Level:

=8.25 inches above top of sparge element (without gas flowing)

Concentration of MeBr in Feed:

15,000 ppm Calibration gas supplied by Scott-Marin, Riverside Calif.

Aqueous phase was charged to the plastic tank. A known concentration (15,000 ppm) of methyl bromide gas under pressure was regulated through the flowmeter and passed upwards through the bottom of the plastic box reactor. The outlet concentration of methyl bromide was measured for 10 minutes at an average value of 4,294 ppm with an experimental uncertainty of 1.2%, showing a 70% removal.

Example 4

Equipment

Reactor Vessel: 13 in. by 13 in. rectangular plastic tank fitted with one sparging element centered and entering from one side wall, one inch from the bottom.

Sparger Element: 8.75-inch polyethylene cylinder (Genpore, 0.875 in. OD, 0.5 in ID)

Air Flowrate: 0.51 CFM (GF-1460, Size 4, glass ball, Gilmont Flowmeter)

Aqueous Phase:

5.2 wt % ammonium thiosulfate, 2.6 wt % polyethylene glycol, 2.9% tetraethylene glycol, balance tap water.

Liquid Level:

=11.5 inches above top of sparge element (without gas flowing)

Concentration of MeBr in Feed:

15,000 ppm Calibration gas supplied by Scott-Marin, Riverside Calif.

Aqueous phase was charged to the plastic tank. A known concentration (15,000 ppm) of methyl bromide gas under pressure was regulated through the flowmeter and passed upwards through the bottom of the plastic box reactor. The outlet concentration of methyl bromide was measured for 10 minutes at an average value of 1,952 ppm with an experimental uncertainty of 1.2%, showing a 86% removal.

Example 5

Equipment

Reactor Vessel: 13 in. by 13 in. rectangular plastic tank fitted with one sparging element centered and entering from one side wall, one inch from the bottom.

Sparger Element: 8.75-inch polyethylene cylinder (Genpore, 0.875 in. OD, 0.5 in ID)

Air Flowrate: 0.51 CFM (GF-1460, Size 4, glass ball, Gilmont Flowmeter)

Aqueous Phase:

9.5 wt % ammonium thiosulfate, balance tap water.

Liquid Level:

=11.5 inches above top of sparge element (without gas flowing)

Concentration of MeBr in Feed:

15,000 ppm Calibration gas supplied by Scott-Marin, Riverside Calif.

Aqueous phase was charged to the plastic tank. A known concentration (15,000 ppm) of methyl bromide gas under pressure was regulated through the flowmeter and passed upwards through the bottom of the plastic box reactor. The outlet concentration of methyl bromide was measured for 10 minutes at an average value of 2,906 ppm with an experimental uncertainty of 1.2%, showing a 80% removal.

Example 6

Equipment

Reactor Vessel: 13 in. by 13 in. rectangular plastic tank fitted with two sparging elements whose centerlines were 6 inches apart and 3.5 inches from the nearest side wall, one inch from the bottom.

Sparger Elements: Two 8.75-inch polyethylene cylinders (Genpore, 0.875 in. OD, 0.5 in ID)

Air Flowrate: 0.76 CFM (GF-1460, Size 4, glass ball, Gilmont Flowmeter)

Aqueous Phase:

5.8 wt % ammonium thiosulfate, 2.9 wt % polyethylene glycol, 3.2 wt % tetraethylene glycol, balance tap water.

Liquid Level:

=11.5 inches above top of sparge element (without gas flowing)

Concentration of MeBr in Feed:

15,000 ppm Calibration gas supplied by Scott-Marin, Riverside Calif.

Aqueous phase was charged to the plastic tank. A known concentration (15,000 ppm) of methyl bromide gas under pressure was regulated through the flowmeter and passed upwards through the bottom of the plastic box reactor and distributed to both sparging elements. The outlet concentration of methyl bromide was measured for 10 minutes at an average value of 3,800 ppm with an experimental uncertainty of 1.2%, showing a 73% removal.

Example 7

Equipment

Reactor Vessel: 13 in. by 13 in. rectangular plastic tank fitted with two sparging elements whose centerlines were 6 inches apart and 3.5 inches from the nearest side wall, one inch from the bottom.

Sparger Elements: Two 8.75-inch polyethylene cylinders (Genpore, 0.875 in. OD, 0.5 in ID)

Air Flowrate: 1.02 CFM (GF-1460, Size 4, glass ball, Gilmont Flowmeter)

Aqueous Phase:

5.8 wt % ammonium thiosulfate, 2.9 wt % polyethylene glycol, 3.2 wt % tetraethylene glycol, balance tap water.

Liquid Level:

=11.5 inches above top of sparge element (without gas flowing)

Concentration of MeBr in Feed:

15,000 ppm Calibration gas supplied by Scott-Marin, Riverside Calif.

Aqueous phase was charged to the plastic tank. A known concentration (15,000 ppm) of methyl bromide gas under pressure was regulated through the flowmeter and passed upwards through the bottom of the plastic box reactor and distributed to both sparging elements. The outlet concentration of methyl bromide was measured for 10 minutes at an average value of 3,250 ppm with an experimental uncertainty of 1.2%, showing a 77% removal. All Examples were performed at ambient temperature. When the solution pH dropped below 9, it was brought back above this value by addition of aqueous sodium hydroxide.

Example 8

Equipment

Reactor Vessel: 80 in. by 132 in. rectangular plastic tank fitted with a center spine distributor (2 in. Schedule 80 plastic pipe) with sparger elements mounted on it, 5.5 inches apart, 2.5 inches from the bottom of the tank.

Sparger Elements: Forty 28-inch long polyethylene cylinders (Genpore, 0.875 in. OD, 0.5 in ID)

Air Flowrate: 66 CFM (KEY Instruments, Acrylic Flowmeter, McMaster-Carr Catalog No. 5077K22)

Aqueous Phase:

6.0 wt % ammonium thiosulfate, 9.0 wt % polyethylene glycol, balance water.

Liquid Level:

=23 inches above top of sparge element (without gas flowing)

Concentration of MeBr in Feed at Start of Ventilation:

64 ounces per 1,000 ft$^3$ (15,000 ppm). Methogas methyl bromide was supplied by Ameribrom of Newark, N.J.)

Aqueous phase was charged to the plastic tank. Methyl bromide was charged to a large empty sealed (via tarps) volume having an enclosed volume of about 2,840 cubic feet until a concentration of 16,200 ppm was reached (64 ounces per thousand cubic feet). A HEPA filter capable of filtering dust particles to less than 0.3 microns was installed on the feed line to the scrubber. A blower fan was configured to pull fresh air into the tarped volume and deliver air containing methyl bromide from the tarped volume to the scrubber, where it entered the sparger elements. Methyl bromide concentration in the air exiting the scrubber was measured and every 20 seconds and logged into a computer spreadsheet. The introduction of fresh air decreased the concentration of methyl bromide in the volume in line with an exponential decay curve. The same phenomenon, exponential decay, was shown in the outlet concentration. The percent removal averaged 87.4% with a standard deviation of 1.7% over a time period of 31 minutes. Selected data recorded in the spreadsheet are shown below:

| Time of Day | Inlet Concentration (Tarped Volume) ppm | Outlet Concentration (Scrubber Exhaust) ppm | % Removal |
|---|---|---|---|
| 17:46 | 16534 | 0 | Prior to startup |
| 17:49 | 16421 | 0 | Fresh Air start |
| 17:56 | 14,314 | 1062 | 92.6% |
| 17:59 | 13,117 | 1785 | 85.6% |
| 18:02 | 12,202 | 1647 | 86.5% |
| 18:08 | 10,238 | 1647 | 83.9% |
| 18:18 | 7,884 | 816 | 89.7% |
| 18:24 | 6,108 | 754 | 87.7% |

As can be seen by reference to the above examples, alkyl halides such as methyl bromide can be effectively removed from gas streams by using the devices and methods of this invention.

Although the invention is illustrated and described herein with reference to specific embodiments, the invention is not intended to be limited to the details shown. Rather, various modifications may be made in the details within the scope and range of equivalents of the claims without departing from the invention.

What is claimed:

1. A method of removing an alkyl halide from a gas volume, the method comprising: withdrawing a gas stream from the gas volume; passing the gas stream through one or more gas dispersers having therein a plurality of holes, the holes being between 1 and 200 μm across at a widest part thereof, thereby producing gas bubbles; and passing the bubbles through a single continuous liquid phase contained in a reaction vessel, the liquid phase comprising water and a nucleophile, to produce a purified gas stream.

2. The method of claim 1, wherein a majority of the holes are between 1 and 200 µm across at a widest part thereof.

3. The method of claim 1, wherein a distance from an upper end of the one or more dispersers to an upper surface of the liquid phase is between 6 and 120 inches.

4. The method of claim 1, wherein a distance from an upper end of the one or more dispersers to an upper surface of the liquid phase is between 12 and 36 inches.

5. The method of claim 1, wherein the holes are between 10 and 50 µm across at a widest part thereof.

6. The method of claim 1, wherein the nucleophile comprises thiosulfate.

7. The method of claim 1, wherein the nucleophile is selected from the group consisting of aliphatic thiols, aromatic thiols, salts of aliphatic thiols, salts of aromatic thiols, aliphatic disulfides, aliphatic polysulfides, aromatic disulfides, aromatic polysulfides, sulfide anion, bisulfide anion, thiosulfate anion, sulfite anion, bisulfite anion, and thiocyanate anion.

8. The method of claim 1, wherein the single continuous liquid phase is essentially free of suspended undissolved material.

9. The method of claim 1, wherein the single continuous liquid phase further comprises between 1 and 99 wt % of an organic compound dissolved therein.

10. The method of claim 1, wherein the single continuous liquid phase further comprises between 1 and 25 wt % of an organic compound dissolved therein.

11. The method of claim 9, wherein the organic compound does not boil below 125° C.

12. The method of claim 9, wherein the organic compound is a compound according to the formula $H-(OCH_2CHR)_n-OH$, wherein n is an integer from 1 to 20 and R is H or $CH_3$.

13. The method of claim 12, wherein R is H.

14. The method of claim 9, wherein the organic compound is tetraethylene glycol.

15. The method of claim 9, wherein the organic compound is dimethyl formamide, N-methylpyrrolidone, or dimethyl sulfoxide.

16. The method of claim 1, wherein the step of passing the gas stream through the one or more dispersers comprises passing the stream at a flow rate selected to provide a superficial reaction vessel gas velocity of at most 1.1 ft/mm.

17. The method of claim 16, wherein the gas velocity is at most 0.8 ft/mm.

18. The method of claim 1, further comprising recycling the purified gas stream back to the gas volume.

19. The method of claim 1, wherein the single continuous liquid phase consists essentially of water, at least one nucleophile, and, optionally, at least one water-soluble organic compound.

* * * * *